United States Patent
Koyanagi et al.

[15] 3,671,508
[45] June 20, 1972

[54] METHOD FOR PREPARING POLYVINYL CHLORIDE

[72] Inventors: Shunichi Koyanagi, Naoestu; Hajime Kitamura, Saigata; Shigenobu Tajima, Naoetsu, all of Japan

[73] Assignee: Shinetsu Chemical Company

[22] Filed: March 1, 1971

[21] Appl. No.: 120,041

[30] Foreign Application Priority Data

Sept. 30, 1970 Japan..................................45/85120

[52] U.S. Cl......................260/87.1, 260/78.5 CL, 260/86.3, 260/87.5 R, 260/87.5 C, 260/87.5 G, 260/87.7, 260/92.8 W
[51] Int. Cl.......................C08f 1/11, C08f 3/30, C08f 15/02
[58] Field of Search............................260/87.5, 92.8 W, 87.1

[56] References Cited

UNITED STATES PATENTS

| | | | |
|---|---|---|---|
| 2,528,469 | 10/1950 | Condo et al. | 260/92.8 W |
| 3,293,199 | 12/1966 | Abercrombie et al. | 260/92.8 W |
| 3,340,243 | 9/1967 | Beer et al. | 260/92.8 W |

*Primary Examiner*—Joseph L. Schofer
*Assistant Examiner*—John A. Donahue, Jr.
*Attorney*—Harry C. Bierman, Jordan B. Bierman and Bierman & Bierman

[57] ABSTRACT

Vinyl chloride is suspension polymerized in the presence of a catalyst selected from the group consisting of dialkyl peroxy dicarbonate, azo-bis-2,4-dimethyl valeronitrile, azo-bis-2,4,4-trimethyl valero nitrile, azo-bis-4-methoxy-2,4-dimethyl valeronitrile, and acetyl cyclohexyl sulfonyl peroxide, a suspending agent, a fatty alcohol having from eight to 18 carbon atoms and sorbitan oleate. When the rate of conversion reaches at least 50 percent, an organic reducing agent is added to the polymerization system. A polyvinyl chloride having superior particle size distribution, plasticizer absorption, fish eye, initial color and thermal stability is produced.

6 Claims, No Drawings

METHOD FOR PREPARING POLYVINYL CHLORIDE

This invention relates to an improved method for producing polyvinyl chloride by the suspension polymerization of vinyl chloride or a mixture of vinyl monomers containing vinyl chloride as its main component. The suspension polymerization of vinyl chloride has hitherto been conducted in the presence of an oil-soluble catalyst. In the known method a protective colloid such as polyvinyl alcohol, cellulose ether, a copolymer of maleic anhydride with vinyl acetate or, styrene, gelatin, or starch is used as the suspending agent. The use of a polymerization catalyst having an extremely high activity, as for example a dialkylperoxy dicarbonate such as diisopropyl peroxydicarbonate (IPP), dicyclohexyl peroxydicarbonate (DCPP), or azobis-2,4-dimethyl-valeronitrile (DMVN) or acetylcyclohexyl sulfonyl peroxide (ACSP), is also known. It is further known that these high activity catalysts increase the polymerization reaction rate over the reaction rates afforded by catalysts having comparatively low activity as for example lauroyl peroxide and azobisisobutylonitrile. However, high activity catalysts rapidly decompose in the polymerization system. This makes it very different to control the rate of conversion. Further, it tends to have an adverse effect on the properties of the polyvinyl chloride (PVC) produced. Consequently, the amount of high activity catalyst employed must be strictly controlled. The use of only a slight excess of high activity catalyst will accelerate the reaction rate to such an extent that the reaction will be uncontrollable. This will adversely affect the particle size distribution and the initial color of the polyvinyl chloride produced. Moreover, it will result in a reduction of the porosity of the produced polyvinyl chloride. The process may have to be halted, if due to the uncontrolled reaction, it becomes unsafe. When a peroxy dicarbonate, an azo compound having a high activity, or ACSP is used, the polyvinyl chloride which is produced tends to have, for some unknown reason, inferior initial color and thermal stability as compared to polyvinyl chloride produced with the use of a low activity catalyst such as lauroyl peroxide. This holds true even though the peroxy dicarbonate, high activity azo compound or ACSP employed is not employed in excess. Further, when said peroxy dicarbonate, high activity azo compound or ACSP is used, one gets completely unpredictable results with respect to the particle size distribution, gelling property and adsorption of plasticizer.

Several proposals have been made to overcome these difficulties—for example, the joint use of both a high activity catalyst and a low activity catalyst and the use of the additives with the high activity catalyst. However, these unknown methods have disadvantages. Until the present invention, there was no method known which could make the best use of a high activity catalyst and solve the problems referred to above.

It is an object of this invention to provide a simple and economical method for producing a superior quality vinyl chloride polymer using the above-given high activity catalyst. The method of the present invention is characterized in that vinyl chloride or a mixture of vinyl monomers containing vinyl chloride as its main component is suspension polymerized in the presence of at least one polymerization catalyst selected from the group consisting of dialkylperoxy dicarbonates, azo-bis-2,4-dimethyl valeronitrile, azo-bis-2,4,4-trimethyl valeronitrile, azo-bis-4-methoxy-2,4-dimethyl valeronitrile, and acetylcyclohexyl sulfonyl peroxide, a saturated fatty alcohol having eight to 18 carbon atoms, and sorbitan oleate. The polymerization mixture is agitated to initiate the polymerization. When the rate of conversion reaches at least 50 percent, an organic reducing agent is added to the polymerization reaction mixture.

The method of the present invention will now be described in greater detail. The use of a higher fatty alcohol in the suspension polymerization of vinyl chloride is well known. It is also known that the addition of a higher fatty alcohol to a polymerization system in which a dialkylperoxy dicarbonate, such as IPP, is employed as the catalyst, results in a substantial improvement in initial color and thermal stability of the produced polyvinyl chloride. However, if too much dialkylperoxy dicarbonate, high activity azo compound or high activity ACSP is used, the effectiveness of the added higher fatty alcohol will be suppressed. Thus when the polyvinyl chloride product is to be mixed with a large amount of a plasticizer so as to enable its use as a so-called flexible product, the amount of higher alcohol employed must be increased considerably. This raises production cost. This difficulty is overcome in the method of the present invention, by adding both sorbitan oleate and an organic reducing agent to the polymerization system. When the suspension polymerization of vinyl chloride or a mixture of vinyl monomers containing vinyl chloride as its main component is conducted in the presence of said higher fatty alcohol, sorbitan oleate and organic reducing agent, an improvement of the initial color and thermal stability of the polyvinyl chloride produced results. Moreover, this is coupled with an improvement in the particle size distribution and porosity of the polyvinyl chloride product. Thus the method of the present invention results in the production of a polyvinyl chloride having superior processability.

The present invention is based on our finding that sorbitan oleate is the only additive that enables polyvinyl chloride, prepared in the presence of the above mentioned catalysts, to concurrently possess superior processability, initial color and thermal stability. It is also based on our finding that the sorbitan oleate is most effective when employed together with a higher fatty alcohol and an organic reducing agent. It should, however, be noted that the organic reducing agent acts as a polymerization inhibitor. Therefore, it should not be added at an early stage of the polymerization reaction. Instead, it should be added when the rate of conversion has reached at least 50 percent.

The catalyst employed in practicing the method of the instant invention, comprises at least one member selected from the group consisting of dialkyl peroxydicarbonates (such as diisobutylperoxydicarbonate, diisopropyl peroxydicarbonate, di-2-ethylhexyl peroxydicarbonate, dicyclohexyl peroxydicarbonate and bis-1,4-tertiary butyl cyclohexyl peroxydicarbonate), azonitriles (such as azo-bis-2,4-dimethylvaleronitrile, azo-bis-2,4-trimethylvaleronitrile and azo-bis-4-methoxy-2,4-dimethylvaleronitrile), and acetylcyclohexyl sulfonyl peroxide. Along with the catalyst one may employ those materials which are usually used in the suspension polymerization of vinyl chloride—for example, lauroyl peroxide, benzoyl peroxide and azobis-isobutyronitirle. The amount of catalyst to be used varies with and is dependent upon the kind of polyvinyl chloride to be prepared, its intended use, the desired rate of conversion. Preferably the catalyst is employed at a concentration of at most 0.2 part by weight, more preferably at most 0.1 part by weight, based on the amount of the vinyl chloride monomer or the mixture of vinyl monomers containing vinyl chloride monomer.

Any of the known suspending agents usually employed in the polymerization of vinyl chloride may be used. For example, polyvinyl alcohol, partially saponified polyvinyl acetate having a saponification degree of at least 70 percent, polyvinylmethyl ether, water-soluble copolymers of polyvinylmethyl ether, copolymers of maleic anhydride with vinyl acetate or styrene, partially saponified polyacrylic esters, cellulose ethers such as methylcellulose, hydroxyethyl methylcellulose, hydroxypropyl methylcellulose ether, carboxymethylcellulose ether, gelatin, starch and gum arabic. The suspending agent is added to the polymerization system usually in an amount of from 0.01 to 0.5 percent by weight, based on the amount of the vinyl chloride monomer or mixture of vinyl monomers containing vinyl chloride monomer.

The higher fatty alcohol to be added to the vinyl chloride polymerization system must be a saturated alcohol having from eight to 18 carbon atoms. Examples of said higher fatty alcohol include octyl alcohol, decanoyl alcohol, lauryl alcohol, myristyl alcohol, cetyl alcohol, and stearyl alcohol. The higher fatty alcohol is employed in the polymerization in an amount of from 0.03 to 0.1 percent by weight based on the amount of the vinyl chloride monomer or mixture of vinyl monomers containing vinyl chloride monomer. If it is added in an amount of less than 0.03 percent, the alcohol will not exert a sufficient effect. The addition of more than 0.1 percent alcohol is uncalled for as such addition will not afford a proportional increase in its desired effect. The sorbitan oleate used with the higher fatty alcohol is exemplified by sorbitan monooleate, sorbitan trioleate and sorbitan sesquioleate. The sorbitan oleate is preferably used in an amount of from 0.01 to 0.5 percent by weight, based on the weight of the vinyl chloride monomer or mixture of vinyl monomers containing vinyl chloride monomer. If it is used in a amount of less than 0.01 percent by weight, the sorbitan oleate will not have a sufficient effect. If it is used in an amount over 0.5 percent, the rate of reaction will be substantially decreased. The reducing agent, which is added to the polymerization system when the rate of conversion reaches at least 50 percent, is selected from the group consisting of hydroquinone, biphenol A, and sulfoxide prepared from a formaldehyde condensate. The reducing agent may be added to the suspension after the polymerization is over providing that the rate of conversion of the system is at least 50 percent. The reducing agent is added to the polymerization system in an amount of at least 0.005 percent by weight, based on the amount of vinyl chloride polymer. Preferably it is added in an amount of from 0.005 to 0.05 percent, based on the amount of vinyl chloride polymer because, if it is added in an amount more than 0.05 percent, the thermal stability of the vinyl chloride polymer produced may be adversely affected.

It should be noted that with respect to each of the catalyst, suspending agent, fatty alcohol, sorbitan oleate and reducing agent, one can employ one representative compound or a mixture of representative compounds from the above given respective groups. Various organic solvents may also be used to control the molecular weight of the polyvinyl chloride.

The polymerization of the present invention is preferably carried out at a temperature of from 30° to 70° C, which temperature range is that which is usually employed in the known methods for the suspension polymerization of vinyl chloride. The method of the present invention can however be effectively carried out even at temperatures below 30° C. In such case, a special catalyst such as trialkyl boron or an alcohol such as methanol or ethanol may be concurrently employed.

The method of the present invention is applicable not only to the polymerization of vinyl chloride alone, but also to the copolymerization of vinyl chloride with other vinyl monomers copolymerizable with it. Examples of such vinyl monomers include vinyl esters, vinyl ethers, alkyl acrylates, alkyl methacrylate, maleic anhydride, alkyl esters of maleic acid or of fumaric acids, alkyl itaconates, aromatic vinyls, vinylidene halides, vinyl halides excepting vinyl chloride, and α-olefins having at most four carbon atoms.

The method of the present invention will now be further described with reference to the following examples wherein the properties of the polyvinyl chloride produced were determined by the following test methods.

1. Plasticizer Absorption

To polyvinyl chloride (PVC) was added twice its amount of di-2-ethyl hexylphthalate (DOP). The resultant mixture was permitted to stand at room temperature for 1 hour. It was then placed in a tube, the bottom of which was filled with glass fiber to permit removal of DOP. The tube was then placed in a centrifugal separator and was rotated therein at a speed of 3,000 rpm, for a period of 1 hour. The separated DOP was removed, and the PVC which had absorbed DOP was weighed. The ratio (in percent) of DOP absorbed by 100 g of PVC was derived from the ratio of the weight of PVC before it has absorbed DOP to that of PVC after it had absorbed DOP.

2. Initial Color

Fifty parts of DOP, 1 part of dibutyltin dilaurate and 0.5 part of cadmium stearate were added to 100 parts of the polyvinyl chloride (PVC) and mixed therewith at 100° C, for 30 minutes. The mixture was then molded into a 5 × 10 mm angular stick by means of an extruder having an inside diameter of 20 mm. The cylinder temperature of the extruder was 160° C. The die temperature was 195° C. The color of the stick as observed with the naked eye was used as a measure of the initial color of the PVC.

3. Thermal Stability 2.5 parts of dibutyltin maleate and 0.5 part of stearic acid were added to 100 parts of PVC. The mixture was kneaded for 10 minutes on a hot roll at 170° C to produce a 0.7 mm thick sheet. The sheet was heated at 185° C in a gear oven. The time elapsed before the sheet blackened was used as a measure of the thermal stability of the PVC.

4. Fish Eye

Fifty parts of DOP, 2.0 parts of dibutyltin dilaurate, 0.8 part of cetyl alcohol, 0.1 part of barium stearate, 0.1 part of cadmium stearate, 0.5 part of titanium oxide, and 0.1 part of carbon black were added to 100 parts of PVC. The mixture was kneaded for 7 minutes on a hot roll at 150° C to produce a 0.2 mm thick sheet. Light was passed through the sheet and the number of fish eyes per 100 $cm^2$ of the sheet, as observed with the naked eye, was employed as an indication of the extent of fish eye production in the PVC.

Controls I – II

Five-hundred liters of water were placed into a stainless steel polymerizing vessel, having an inner capacity of 1,000 liters. Two-hundred gram of partially saponified polyvinyl acetate (saponification degree: 81 mole percent, average degree of polymerization: 1,820), cetyl alcohol and sorbitan monooleate each in the amount given in Table 1, and 250 kg of vinyl chloride monomer were dissolved therein. Upon the further addition of 37.5 g of IPP, polymerization was carried out at 57° C for 10 hours. Unreacted vinyl chloride monomer was removed from the system. The polymerization product was stirred for 15 minutes with (or without) an addition of a methanol solution of biphenol A in the amount given in Table 1. Then the polymerization product produced was dehydrated and dried. The properties of the PVC thus produced are shown in the following Table 1.

TABLE 1

| Control Number | 1 | 2 | 3 | 4 | 5 | 6 | 7 | 8 | 9 | 10 | 11 | 12 |
|---|---|---|---|---|---|---|---|---|---|---|---|---|
| Amount of cetyl alcohol (percent)/VC* | 0 | 0.01 | 0.2 | 1.5 | 0 | 0 | 0 | 0 | 0.2 | 0.2 | 0 | 0.2 |
| Amount of sorbitan monooleate (percent)/VC* | 0 | 0 | 0 | 0 | 0.003 | 0.05 | 1.0 | 0 | 0.05 | 0 | 0.05 | 0.05 |
| Amount of bisphenol A (percent)/VC* | 0 | 0 | 0 | 0 | 0 | 0 | 0 | 0.02 | 0 | 0.02 | 0.02 | 0.1 |
| Particle size distribution (percent): | | | | | | | | | | | | |
| 60 mesh pass | 88.5 | 89.2 | 90.3 | 86.3 | 91.5 | 92.0 | 43.5 | 88.5 | 97.8 | 90.3 | 92.0 | 97.8 |
| 100 mesh pass | 38.3 | 40.5 | 43.5 | 35.5 | 45.3 | 50.1 | 21.0 | 38.3 | 49.9 | 43.5 | 50.1 | 49.9 |
| 200 mesh pass | 3.6 | 2.9 | 4.5 | 4.0 | 5.0 | 5.9 | 2.3 | 3.6 | 4.0 | 4.5 | 5.9 | 4.0 |
| DOP absorption (percent) | 17.5 | 16.3 | 16.5 | 15.9 | 17.8 | 28.9 | ...... | 17.5 | 30.5 | 16.5 | 28.9 | 30.5 |
| Fish eye (pieces) | 120 | 140 | 110 | 200 | 120 | 43 | ...... | 120 | 130 | 110 | 43 | 30 |
| Initial color | 4 | 4 | 4 | 3 | 4 | 4 | ...... | 4 | 3 | 2 | 3 | 1 |
| Thermal stability (min.) | 80 | 90 | 90 | 90 | 80 | 80 | ...... | 80 | 90 | 80 | 80 | 60 |

*(Percent)/VC means percent based on the weight of the vinyl chloride.

Examples 1–8

Five-hundred liters of water, 200 grams of partially saponified polyvinyl acetate (saponification degree: 81 mole percent; average degree of polymerization: 1,820), cetyl alcohol and sorbitan monooleate each in the amount given in Table 2, and 250 kg of vinyl chloride monomer were charged into a stainless steel polymerization vessel having an inner capacity of 1,000 liters. 37.5 g of IPP were added thereto and polymerization was carried out at 57° C for 10 hours. Unreacted vinyl chloride monomer was removed from the system. Biphenol A was added in the amount given in Table 2. The polymerization product was stirred for 15 minutes, then dehydrated and dried. The properties of the PVC thus prepared are shown in Table 2 below.

TABLE 2

| Example Number | 1 | 2 | 3 | 4 | 5 | 6 | 7 | 8 |
|---|---|---|---|---|---|---|---|---|
| Amount of cetyl alcohol (percent)/VC* | 0.2 | 0.2 | 0.05 | 0.05 | 0.1 | 0.1 | 0.5 | 0.1 |
| Amount of sorbitan monooleate (percent)/VC* | 0.05 | 0.1 | 0.05 | 0.05 | 0.1 | 0.05 | 0.2 | 0.2 |
| Amount of bisphenol A (percent)/VC* | 0.02 | 0.02 | 0.03 | 0.03 | 0.01 | 0.04 | 0.01 | 0.01 |
| Particle size distribution (percent): | | | | | | | | |
| 60 mesh pass | 97.8 | 99.5 | 96.5 | 98.0 | 97.0 | 97.0 | 99.9 | 99.8 |
| 100 mesh pass | 49.9 | 50.1 | 40.8 | 47.5 | 40.3 | 40.3 | 58.8 | 60.1 |
| 200 mesh pass | 4.0 | 1.8 | 3.9 | 2.9 | 3.5 | 3.5 | 3.0 | 2.9 |
| DOP absorption (percent) | 30.5 | 33.4 | 29.5 | 32.3 | 30.3 | 30.3 | 40.0 | 36.8 |
| Fish eye (pieces) | 30 | 12 | 23 | 20 | 13 | 13 | 9 | 25 |
| Initial color | 1 | 0 | 1 | 0 | 1 | 0 | 0 | 0 |
| Thermal stability (min.) | 100 | 100 | 100 | 90 | 100 | 90 | 100 | 100 |

*(Percent)/VC means percent based on the weight of the vinyl chloride.

Examples 9-11 and Control 13

Experiments as described in Example 1 were carried out, the only difference being that the cetyl alcohol was replaced by other saturated fatty alcohols. The results obtained are given in Table 3 below.

TABLE 3

| Number | Experiment 9 | 10 | 11 | Control 13 |
|---|---|---|---|---|
| Kind of alcohol added | Octyl alcohol | Decanoyl alcohol | Myristyl alcohol | n-Butyl alcohol |
| Particle size distribution (percent): | | | | |
| 60 mesh pass | 96.9 | 98.8 | 96.8 | 80.5 |
| 100 mesh pass | 50.3 | 51.0 | 46.5 | 60.3 |
| 200 mesh pass | 4.0 | 2.5 | 3.0 | 12.1 |
| DOP absorption (percent) | 35.6 | 30.1 | 31.5 | 20.3 |
| Fish eye | 25 | 15 | 30 | 250 |
| Initial color | 1 | 0 | 1 | 5 |
| Thermal stability (min.) | 90 | 100 | 100 | 80 |

The results set forth in Table 3 show that when n-butyl alcohol was employed, there was no improvement in particle size distribution and thermal stability. Moreover, the DOP absorption and initial color values were deteriorated as compared to the corresponding values obtained in the absence of cetyl alcohol.

Example 12 and Control 14

Experiments as described in Example 1 were conducted; the only difference being that sorbitan monooleate was replaced by either sorbitan trioleate or sorbitan monolaurate. The results obtained are given in Table 4 below.

TABLE 4

| Number | Example 12 | Control 14 |
|---|---|---|
| Kind of surface active agent | Sorbitan trioleate | Sorbitan monolaurate |
| Particle size distribution (percent): | | |
| 60 mesh pass | 99.0 | 51.9 |
| 100 mesh pass | 35.5 | 23.5 |
| 200 mesh pass | 1.7 | 10.0 |
| DOP absorption (percent) | 29.7 | 26.5 |
| Initial color | 0 | 3 |
| Thermal stability (min.) | Over 100 | 80 |

The results set forth in Table 4 show that when sorbitan monolaurate was employed, the particle size distribution of PVC proved to be extraordinary. Additionally, there was no improvement in the initial color.

Examples 13 and 14

Experiments as described in Example 1 were conducted; the only difference being that biphenol A (the reducing agent) was replaced by 0.01 percent of hydroquinone or 0.01 percent of sulfoxylate (SFS) prepared from a formaldehyde condensate. The results obtained are given in Table 5.

TABLE 5

| No. | Example 13 | Example 14 |
|---|---|---|
| Kind of reducing agent | Hydroquinone | SFS |
| Initial color | 1 | 1 |
| Thermal stability (min) | 100 | 100 |

For the sake of comparison, 0.01 percent of ferrous sulfate or 0.01 percent of oxalic acid (both well-known reducing agents) was employed. In the former case, PVC exhibited yellow coloration upon drying. In the latter case it exhibited a pale red coloration upon drying.

Examples 15 and 16, and Control 15

Experiments as described in Example 1 were carried out; the only difference being that biphenol A was added during the course of the polymerization. The results obtained are given in the following Table 6.

TABLE 6

| No. | Control 15 | Example 15 | Example 16 |
|---|---|---|---|
| Time (hr) elapsed from the start of polymerization to the point at which the biphenol A was added | 6 | 7.5 | 9 |
| Rate of conversion (%) when the biphenol A was added | 41 | 55 | 73 |
| Total polymerization time (hr) | Suspended after 15 hours | 11 | 10.3 |
| Particle size distribution (%) | | | |
| 60 mesh pass | 75.9 | 98.5 | 99.0 |
| 100 mesh pass | 43.6 | 46.6 | 51.1 |
| 200 mesh pass | 4.2 | 3.9 | 3.5 |
| Initial color | 0 | 0 | 0 |
| Thermal stability (min) | 70 | 90 | 100 ** |

As is obvious from the results of Table 6 above, in Examples 15 and 16, no particular retardation was observed in the progress of the reaction, and the resultant products exhibited superior properties. In contrast thereto, with Control 15 the progress of the polymerization reaction was remarkably delayed. The pressure within the polymerization vessel showed no reduction even 15 hours after the start of the reaction. The reaction was therefore suspended. Moreover at that time only a 70 percent rate of conversion and a very wide PVC particle size distribution showing a large amount of fine particles was attained.

Examples 17 – 23, and Controls 16 – 22

Five-hundred liters of water, 200 g of partially saponified polyvinyl acetate, 500 g of cetyl alcohol, 75 g of sorbitan mono-oleate and 250 kg of vinyl chloride monomer were placed into a stainless steel polymerization vessel having an inner capacity of 1,000 liters. The mixture was polymerized at 57° C in the presence of one of the catalysts given in Table 7. Upon completion of the polymerization, 50 g of bisphenol A dissolved in 2 liters of methanol were added to the system. The system was stirred. The polymerization product was then dehydrated and dried. PVC having the properties given in the following Table 7 was thereby obtained.

For the sake of comparison, experiments similar to the above were carried out. In these comparative experiments, cetyl alcohol, sorbitan monooleate, and the bisphenol A added on completion of the polymerization were not employed. The properties of the PVC thus prepared are set forth in the following Table 7 in the columns designated as Controls 16 – 22.

TABLE 7

| Example Number | 17 | 18 | 19 | 20 | 21 | 22 | 23 |
|---|---|---|---|---|---|---|---|
| Kind of catalyst and amount of catalyst (percent)/VC* | OPP (0.015) | BPP (0.015) | HPP (0.02) | BCP (0.025) | DMVN (0.015) TMVN (0.015) | DMVN (0.015) MOVN (0.015) | DMVN (0.015) ACSP (0.015) |
| Total polymerization time (hr.) | 10.5 | 10.0 | 11.0 | 11.0 | 9.0 | 8.5 | 9.5 |
| Particle size distribution (percent): | | | | | | | |
| 60 mesh pass | 99.1 | 96.8 | 98.8 | 99.0 | 99.1 | 98.9 | 98.0 |
| 100 mesh pass | 45.5 | 50.3 | 40.6 | 44.5 | 46.0 | 49.1 | 50.0 |
| 200 mesh pass | 2.5 | 3.0 | 4.0 | 3.5 | 3.8 | 2.9 | 2.0 |
| DOP absorption (percent) | 29.9 | 30.0 | 31.1 | 30.5 | 34.0 | 33.0 | 37.9 |
| Fish eye (pieces) | 40 | 35 | 35 | 20 | 15 | 9 | 25 |
| Initial color | 0 | 1 | 1 | 1 | 0 | 0 | 0 |
| Thermal stability (min.) | 100 | 100 | 100 | 90 | 100 | 100 | 100 up |

| Control Number | 16 | 17 | 18 | 19 | 20 | 21 | 22 |
|---|---|---|---|---|---|---|---|
| Kind of catalyst and amount of catalyst (percent)/VC* | OPP (0.015) | BPP (0.015) | HPP (0.02) | BCP (0.025) | DMVN (0.015) TMVN (0.015) | DMVN (0.015) MOVN (0.015) | DMVN (0.015) ACSP (0.015) |
| Total polymerization time (hr.) | 10.5 | 10.0 | 11.0 | 11.0 | 9.0 | 8.5 | 9.5 |
| Particle size distribution (percent): | | | | | | | |
| 60 mesh pass | 77.7 | 70.6 | 66.9 | 60.8 | 80.3 | 86.9 | 60.0 |
| 100 mesh pass | 39.8 | 37.8 | 40.8 | 31.2 | 35.6 | 40.1 | 30.8 |
| 200 mesh pass | 2.5 | 5.0 | 2.0 | 4.3 | 2.5 | 3.0 | 2.1 |
| DOP absorption (percent) | 18.0 | 18.8 | 15.9 | 16.0 | 19.5 | 20.3 | 15.0 |
| Fish eye (pieces) | 100 | 107 | 135 | 233 | 300 | 201 | 193 |
| Initial color | 3 | 4 | 4 | 4 | 4 | 4 | 5 |
| Thermal stability (min.) | 90 | 80 | 80 | 90 | 80 | 90 | 70 |

*Percent/VC means percent based on the weight of the vinyl chloride.

NOTE: OPP: Di-2-ethylhexylperoxy dicarbonate;
BPP: Di-sec-butylperoxy dicarbonate;
HPP: Dicyclohexylperoxy dicarbonate;
BCP: Bis (ter butylcyclohexyl) peroxy dicarbonate;
TMVN Azobis-2,4,4-trimethylvaleronitrile;
MOVN Azobis-4-methoxy-2,4-dimethylvaleronitrile;
ACSP Acetylcyclohexylsulfonyl peroxide.

Examples 24 – 26 and Controls 23 – 25

Five-hundred liters of water, 125 g of partially saponified polyvinyl acetate (saponification degree: 80 mole percent; average degree of polymerization: 1,820), 75 g of methyl cellulose (viscosity of 2 percent aqueous solution at 20° C: 45 cps), cetyl alcohol and sorbitan monooleate each in the amount given in Table 8, 225 kg of vinyl chloride and 25 kg of vinyl acetate, were charged into a stainless steel polymerization vessel having an inner capacity of 1,000 liters. The mixture was copolymerized at 58° C in the presence of 62.5 g of DMVN as a catalyst. Fifty gram of bisphenol A and 25 g of hydroquinone were dissolved in 3 liters of methanol. This methanol solution was added to the polymerization system 11 hours after the start of the polymerization. The polymerization was then continued for an additional hour. The results obtained are given in the following Table 8.

TABLE 8

| Number | Example | | | Control | | |
|---|---|---|---|---|---|---|
| | 24 | 25 | 26 | 23 | 24 | 25 |
| Amount of cetyl alcohol (percent)/VC* | 0.1 | 0.3 | 0.1 | 0 | 0.3 | 0 |
| Amount of sorbitan monooleate (percent)/VC* | 0.05 | 0.05 | 0.1 | 0 | 0 | 0.05 |
| Particle size distribution (percent): | | | | | | |
| 60 mesh pass | 99.9 | 99.8 | 100.0 | 90.1 | 91.1 | 95.6 |
| 100 mesh pass | 47.6 | 43.0 | 39.9 | 51.1 | 49.8 | 53.3 |
| 200 mesh pass | 4.3 | 3.9 | 2.0 | 5.6 | 5.0 | 6.0 |
| DOP absorption (percent) | 25.6 | 23.9 | 28.8 | 10.1 | 9.0 | 12.3 |
| Initial color | 0 | 0 | 0 | 4 | 3 | 4 |
| Thermal stability (min.) | 80 | 90 | 80 | 50 | 50 | 40 |

*(Percent)/VC means percent based on the weight of the vinyl chloride.

What is claimed is:

1. In a method for suspension polymerizing vinyl chloride monomer or a mixture of vinyl monomers containing vinyl chloride as its main component in an aqueous reaction medium containing a suspending agent and in the presence of a polymerization catalyst, the improvement which comprises said catalyst is selected from the group consisting of dialkyl peroxy dicarbonate, azo-bis-2,4-dimethylvaleronitrile, azo-bis-2,4,4-trimethylvaleronitrile, azo-bis-4-methoxy-2,4-dimethylvaleronitrile, acetylcyclohexyl sulfonyl peroxide and mixtures thereof, the polymerization is conducted in the presence of a fatty alcohol having from eight to 18 carbon atoms and sorbitan oleate, and an organic reducing agent selected from the group consisting of bisphenol A, hydroquinone, sulfoxylate of the condensate of formaldehyde, and mixtures thereof is added to the reaction medium when a rate of conversion of at least 50 percent is realized.

2. The method of claim 1 in which the catalyst is selected from the group consisting of di-isobutyl peroxy dicarbonate, di-isopropyl peroxy dicarbonate, di-2-ethyl-hexylperoxy dicarbonate, di-cyclohexyl-peroxy dicarbonate, bis-1,4-tertiary-butyl cyclohexyl peroxy dicarbonate, azo-bis-2,4-dimethylvaleronitrile, azo-bis-2,4,4-trimethyl valeronitrile, azo-bis-4-methoxy-2,4-dimethylvaleronitrile and acetylcyclohexysulfonyl peroxide, and the catalyst is present in an amount of at most 0.2 percent by weight, based on the weight of the vinyl chloride or mixture of vinyl monomers containing vinyl chloride.

3. The method of claim 1 in which the fatty alcohol is selected from the group consisting of octyl alcohol, decanoyl alcohol, lauryl alcohol, myristyl alcohol, cetyl alcohol and stearyl alcohol and the fatty alcohol is present in an amount of from 0.03 to 0.1 percent by weight, based on the weight of the vinyl chloride or mixture of vinyl monomers containing vinyl chloride.

4. The method of claim 1 in which the sorbitan oleate is selected from the group consisting of sorbitan monooleate, sorbitan trioleate and sorbitan sesquioleate, and the sorbitan oleate is present in an amount of from 0.01 to 0.5 percent by weight based on the weight of the vinyl chloride or mixture of vinyl monomers containing vinyl chloride.

5. The method of claim 1 in which the organic reducing agent is added in an amount of from 0.005 to 0.5 percent by weight based on the weight of the vinyl chloride or mixture of vinyl monomers containing vinyl chloride.

6. The method of claim 1 in which the organic reducing agent is added to the reaction medium on completion of the polymerization of the vinyl chloride or the mixture of vinyl monomers containing vinyl chloride.

* * * * *

UNITED STATES PATENT OFFICE
CERTIFICATE OF CORRECTION

Patent No. 3,671,508    Dated June 20, 1972

Inventor(s) Shunichi Koyanagi, et. al.

It is certified that error appears in the above-identified patent and that said Letters Patent are hereby corrected as shown below:

In the grant only, insert columns 3 and 4, as shown on the attached sheet.

Signed and sealed this 26th day of December 1972.

(SEAL)
Attest:

EDWARD M. FLETCHER, JR.  
Attesting Officer

ROBERT GOTTSCHALK  
Commissioner of Patents amount of the vinyl chloride monomer or mixture of vinyl monomers containing vinyl chloride monomer. If it is added in an amount of less than 0.03 percent, the alcohol will not exert a sufficient effect. The addition of more than 0.1 percent alcohol is uncalled for as such addition will not afford a proportional increase in its desired effect. The sorbitan oleate used with the higher fatty alcohol is exemplified by sorbitan monooleate, sorbitan trioleate and sorbitan sesquioleate. The sorbitan oleate is preferably used in an amount of from 0.01 to 0.5 percent by weight, based on the weight of the vinyl chloride monomer or mixture of vinyl monomers containing vinyl chloride monomer. If it is used in a amount of less than 0.01 percent by weight, the sorbitan oleate will not have a sufficient effect. If it is used in an amount over 0.5 percent, the rate of reaction will be substantially decreased. The reducing agent, which is added to the polymerization system when the rate of conversion reaches at least 50 percent, is selected from the group consisting of hydroquinone, biphenol A, and sulfoxide prepared from a formaldehyde condensate. The reducing agent may be added to the suspension after the polymerization is over providing that the rate of conversion of the system is at least 50 percent. The reducing agent is added to the polymerization system in an amount of at least 0.005 percent by weight, based on the amount of vinyl chloride polymer. Preferably it is added in an amount of from 0.005 to 0.05 percent, based on the amount of vinyl chloride polymer because, if it is added in an amount more than 0.05 percent, the thermal stability of the vinyl chloride polymer produced may be adversely affected.

It should be noted that with respect to each of the catalyst, suspending agent, fatty alcohol, sorbitan oleate and reducing agent, one can employ one representative compound or a mixture of representative compounds from the above given respective groups. Various organic solvents may also be used to control the molecular weight of the polyvinyl chloride.

The polymerization of the present invention is preferably carried out at a temperature of from 30° to 70° C, which temperature range is that which is usually employed in the known methods for the suspension polymerization of vinyl chloride. The method of the present invention can however be effectively carried out even at temperatures below 30° C. In such case, a special catalyst such as trialkyl boron or an alcohol such as methanol or ethanol may be concurrently employed.

The method of the present invention is applicable not only to the polymerization of vinyl chloride alone, but also to the copolymerization of vinyl chloride with other vinyl monomers copolymerizable with it. Examples of such vinyl monomers include vinyl esters, vinyl ethers, alkyl acrylates, alkyl methacrylate, maleic anhydride, alkyl esters of maleic acid or of fumaric acids, alkyl itaconates, aromatic vinyls, vinylidene halides, vinyl halides excepting vinyl chloride, and α-olefins having at most four carbon atoms.

The method of the present invention will now be further described with reference to the following examples wherein the properties of the polyvinyl chloride produced were determined by the following test methods.

1. Plasticizer Absorption

To polyvinyl chloride (PVC) was added twice its amount of di-2-ethyl hexylphthalate (DOP). The resultant mixture was permitted to stand at room temperature for 1 hour. It was then placed in a tube, the bottom of which was filled with glass fiber to permit removal of DOP. The tube was then placed in a centrifugal separator and was rotated therein at a speed of 3,000 rpm, for a period of 1 hour. The separated DOP was removed, and the PVC which had absorbed DOP was weighed. The ratio (in percent) of DOP absorbed by 100 g of PVC was derived from the ratio of the weight of PVC before it has absorbed DOP to that of PVC after it had absorbed DOP.

2. Initial Color

Fifty parts of DOP, 1 part of dibutyltin dilaurate and 0.5 part of cadmium stearate were added to 100 parts of the polyvinyl chloride (PVC) and mixed therewith at 100° C, for 30 minutes. The mixture was then molded into a 5 × 10 mm angular stick by means of an extruder having an inside diameter of 20 mm. The cylinder temperature of the extruder was 160° C. The die temperature was 195° C. The color of the stick as observed with the naked eye was used as a measure of the initial color of the PVC.

3. Thermal Stability 2.5 parts of dibutyltin maleate and 0.5 part of stearic acid were added to 100 parts of PVC. The mixture was kneaded for 10 minutes on a hot roll at 170° C to produce a 0.7 mm thick sheet. The sheet was heated at 185° C in a gear oven. The time elapsed before the sheet blackened was used as a measure of the thermal stability of the PVC.

4. Fish Eye

Fifty parts of DOP, 2.0 parts of dibutyltin dilaurate, 0.8 part of cetyl alcohol, 0.1 part of barium stearate, 0.1 part of cadmium stearate, 0.5 part of titanium oxide, and 0.1 part of carbon black were added to 100 parts of PVC. The mixture was kneaded for 7 minutes on a hot roll at 150° C to produce a 0.2 mm thick sheet. Light was passed through the sheet and the number of fish eyes per 100 $cm^2$ of the sheet, as observed with the naked eye, was employed as an indication of the extent of fish eye production in the PVC.

Controls 1 – 11

Five-hundred liters of water were placed into a stainless steel polymerizing vessel, having an inner capacity of 1,000 liters. Two-hundred gram of partially saponified polyvinyl acetate (saponification degree: 81 mole percent, average degree of polymerization: 1,820), cetyl alcohol and sorbitan monooleate each in the amount given in Table 1, and 250 kg of vinyl chloride monomer were dissolved therein. Upon the further addition of 37.5 g of IPP, polymerization was carried out at 57° C for 10 hours. Unreacted vinyl chloride monomer was removed from the system. The polymerization product was stirred for 15 minutes with (or without) an addition of a methanol solution of biphenol A in the amount given in Table 1. Then the polymerization product produced was dehydrated and dried. The properties of the PVC thus produced are shown in the following Table 1.

TABLE 1

| Control Number | 1 | 2 | 3 | 4 | 5 | 6 | 7 | 8 | 9 | 10 | 11 | 12 |
|---|---|---|---|---|---|---|---|---|---|---|---|---|
| Amount of cetyl alcohol (percent)/VC* | 0 | 0.01 | 0.2 | 1.5 | 0 | 0 | 0 | 0 | 0.2 | 0.2 | 0 | 0.2 |
| Amount of sorbitan monooleate (percent)/VC* | 0 | 0 | 0 | 0 | 0.003 | 0.05 | 1.0 | 0 | 0.05 | 0 | 0.05 | 0.05 |
| Amount of bisphenol A (percent)/VC* | 0 | 0 | 0 | 0 | 0 | 0 | 0 | 0.02 | 0 | 0.02 | 0.02 | 0.1 |
| Particle size distribution (percent): | | | | | | | | | | | | |
| 60 mesh pass | 88.5 | 89.2 | 90.3 | 86.3 | 91.5 | 92.0 | 43.5 | 88.5 | 97.8 | 90.3 | 92.0 | 97.8 |
| 100 mesh pass | 38.3 | 40.5 | 43.5 | 35.5 | 45.3 | 50.1 | 21.0 | 38.3 | 49.9 | 43.5 | 50.1 | 49.9 |
| 200 mesh pass | 3.6 | 2.9 | 4.5 | 4.0 | 5.0 | 5.9 | 2.3 | 3.6 | 4.0 | 4.5 | 5.9 | 4.0 |
| DOP absorption (percent) | 17.5 | 16.3 | 16.5 | 15.9 | 17.8 | 28.9 | | 17.5 | 30.5 | 16.5 | 28.9 | 30.5 |
| Fish eye (pieces) | 120 | 140 | 110 | 200 | 120 | 43 | | 120 | 130 | 110 | 43 | 30 |
| Initial color | 4 | 4 | 4 | 3 | 4 | 4 | | 4 | 3 | 2 | 3 | 1 |
| Thermal stability (min.) | 80 | 90 | 90 | 90 | 80 | 80 | | 80 | 90 | 80 | 80 | 60 |

*(Percent)/VC means percent based on the weight of the vinyl chloride.

Examples 1–8

Five-hundred liters of water, 200 grams of partially saponified polyvinyl acetate (saponification degree: 81 mole percent; average degree of polymerization: 1,820), cetyl alcohol and sorbitan monooleate each in the amount given in Table 2, and 250 kg of vinyl chloride monomer were charged into a stainless steel polymerization vessel having an inner capacity of 1,000 liters. 37.5 g of IPP were added thereto and polymerization was carried out at 57° C for 10 hours. Un-